United States Patent [19]
Lovadina et al.
[11] 3,836,856
[45] Sept. 17, 1974

[54] SYSTEM FOR LIMITING THE RANGE OF A-C SIGNALS

[75] Inventors: Armando Lovadina; Franco Morelli, both of Milan, Italy

[73] Assignee: Societa Italiana Telecomunicazioni Siemens S.p.A., Milan, Italy

[22] Filed: May 11, 1972

[21] Appl. No.: 252,466

[30] Foreign Application Priority Data
May 12, 1972 Italy .................... 24392/71

[52] U.S. Cl. .................... 325/187, 332/38, 328/168
[51] Int. Cl. .................... H04b 1/04
[58] Field of Search .......... 325/187, 62, 38 R, 38 B; 333/14; 332/37, 38; 179/1 VL, 15 AV, 15 AW; 178/68

[56] References Cited
UNITED STATES PATENTS

| | | | |
|---|---|---|---|
| 3,106,680 | 10/1963 | Long | 325/187 |
| 3,249,870 | 5/1966 | Greefkes | 325/38 B |
| 3,500,441 | 3/1970 | Brolin | 325/38 B |
| 3,568,062 | 3/1971 | Brolin | 325/62 |
| 3,609,551 | 9/1971 | Brown | 325/62 |
| 3,646,442 | 2/1972 | Kotch | 179/15 AV |

*Primary Examiner*—Robert L. Griffin
*Assistant Examiner*—Aristotelis M. Psitos
*Attorney, Agent, or Firm*—Karl F. Ross; Herbert Dubno

[57] ABSTRACT

A sinusoidal signal voltage of varying amplitude $V_i$ is compared with a triangular voltage wave of relatively elevated frequency and amplitude to generate a binary voltage with a first value for signal amplitudes higher than the wave amplitude and a second value for signal amplitudes lower than the wave amplitude. The resulting pulse train, upon integration, produces a replica of the original signal having an amplitude $V_o$. To vary the ratio $V_o/V_i$, specifically to reduce it for higher signal amplitudes, a square wave giving rise to the triangular wave is amplitude-modulated in response to the peaks of the signal voltage $V_i$.

10 Claims, 4 Drawing Figures

SYSTEM FOR LIMITING THE RANGE OF A-C SIGNALS

Our present invention relates to a system for limiting the dynamics, i.e., the amplitude range, of alternating-current telecommunication signals.

In the transmission of a-c voltages, especially those in the audio range, the fidelity of reproduction is impaired if the amplitude swing exceeds the range of linear operation of the transmitting and receiving equipment. This is particularly irritating in the case of musical programs but could also be disturbing in voice communication.

It is therefore advantageous, in a telecommunication system with an input voltage $V_i$ ranging widely in amplitude, to provide an amplitude converter whose output voltage $V_o$ varies nonlinearly with $V_i$ so as to compress the voltage swing; a complementary converter at the remote end of the transmission path may then restore the original amplitude range.

Generally, such a converter may operate in either an open or a closed loop. In the first instance, the response time is short (e.g., less than 100$\mu$s) but the desired correlation between output and input voltages is difficult to maintain. In the second instance, such correlation can be readily established at the expense of a delayed response.

The principal object of our present invention, therefore, is to provide a method of and means for modifying the ratio $V_o/V_i$ in a manner combining the advantages of both techniques, i.e., the rapid response of open-loop operation and the accurate control of that amplitude ratio according to a predetermined mathematical relationship.

A more particular object is to provide a system of this character in which the ratio $V_o/V_i$ remains constant for low input-signal amplitudes, up to a predetermined level, and thereafter decreases progressively with increasing peak signal amplitudes so as to provide a generally logarithmic relationship which can be readily reconverted into a linear relationship at the receiving end.

These objects are realized, in accordance with our present invention, by the generation of a triangular voltage wave whose frequency and amplitude exceed those of the signal voltage. This triangular wave, advantageously derived from a locally generated square wave of like frequency, is amplitude-controlled in a nonlinear manner depending on the peak amplitude of the incoming signal voltage $V_i$; a train of pulses of varying width, proportional to an outgoing voltage $V_o$ of desired ratio $V_o/V_i$, is generated by comparing the signal voltage with the triangular wave and by generating a binary voltage whose value depends on whether or not the amplitude of the signal voltage exceeds that of the triangular wave. If the amplitude of the triangular wave were held constant, the pulse width in the resulting pulse train would be a linear function of the signal voltage $V_i$ as measured in successive cycles of the triangular wave; however, the amplitude modulation of the triangular wave makes this function nonlinear. Integration of the pulse train, therefore, yields a substantial replica of the incoming signal wherein the amplitude swing is reduced or otherwise modified.

More particularly, in order to realize an amplitude ratio $V_o/V_i$ which is constant up to a certain value of $V_i$ and thereafter decreases progressively, we maintain the amplitude of the triangular wave (and of the square from which it may be derived) constant as long as the peak input amplitude stays below the critical level; with higher peaks, the amplitude of the triangular wave is increased progressively but at a lesser rate than the peaks unless the system is to operate as an amplitude limiter rather than compressor. A complementary expander may operate in an analogous manner by reducing, instead of increasing, the amplitude of the triangular wave with increasing peak amplitudes of the input signal.

The triangular wave is advantageously of symmetrical (isosceles) configuration even through other shapes, including sawtooth waves, could be utilized.

To control the amplitude modulation of the triangular wave we provide a peak-riding circuit which may include a full-wave rectifier working into a storage capacitor; in a preferred embodiment, the charge stored in this capacitor energizes a clamping circuit which generates a constant control voltage for the amplitude modulator as long as the maximum amplitude of the voltage $V_i$ remains below a predetermined threshold. If the threshold is exceeded, the control voltage rises and either increases or decreases the amplitude of the triangular wave (directly or through its originating square wave) depending on whether compression or expansion is desired.

The above and other features of our invention will be described in greater with reference to the accompanying drawing in which.

Figure 1:
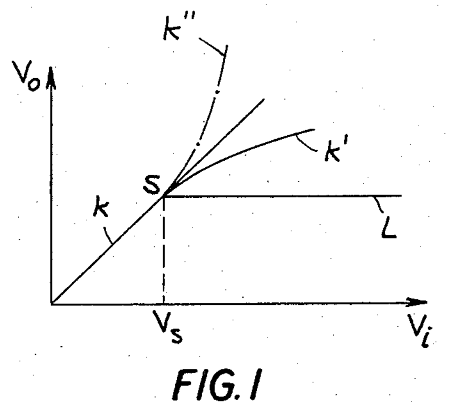
FIG. 1 is a graph illustrating the mode of operation of an amplitude converter according to our invention.

In FIG. 1 we have plotted the output voltage $V_o$ as a function of the input voltage $V_i$, this function being represented by a curve $k'$ which follows a straight line $k$ up to a point S (voltage $V_s$) and thereafter deviates from that line with progressively diminishing slope so that the ratio $V_o/V_i$ decreases. Point S lies on a horizontal line L representing the maximum level which can be reached by the peaks of a sinusoidal or other input voltage with maintenance of strict linearity between voltages $V_o$ and $V_i$.

In an extreme case, the curve $k'$ could merge with line L so that the system operates as an amplitude limiter.

FIG. 1 also shows, at $k''$, a curve with progressively rising slope representing the complementary expansion characteristic to the compression characteristic $k'$.

Figure 2:
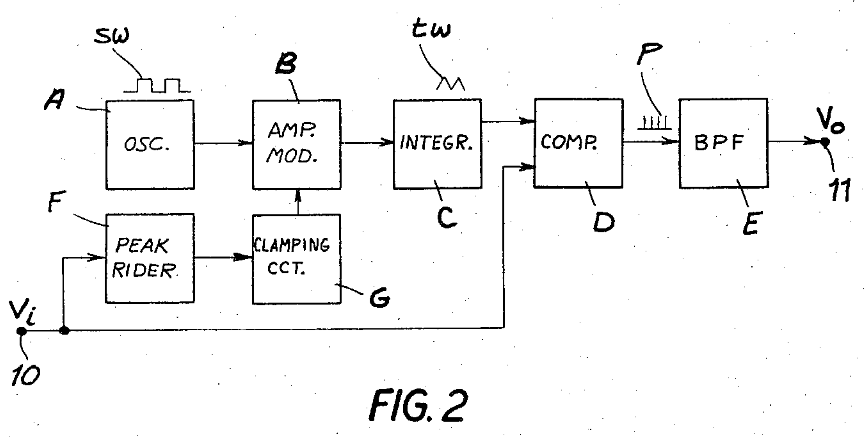
FIG. 2 is a block diagram of such a converter.

FIG. 2 shows a terminal 10 to which the input voltage $V_i$ is delivered by a non illustrated source. This voltage is applied, in parallel, to a peak rider F and to a comparator D, circuit F working into a clamping circuit G controlling an amplitude modulator B in the output of a square-wave oscillator A. An integrator C, connected to modulator B, converts the square wave *sw* of oscillator A, with symmetrical positive and negative half-cycles, into a symmetrical triangular wave *tw* applied to another input of comparator D. The latter gives rise to a train of pulses *p* which are integrated, by the suppression of higher harmonics in a band-pass filter E, to generate on a terminal 11 the output voltage $V_o$ as a substantial replica of input voltage $V_i$ but with modified amplitude.

Figure 3:
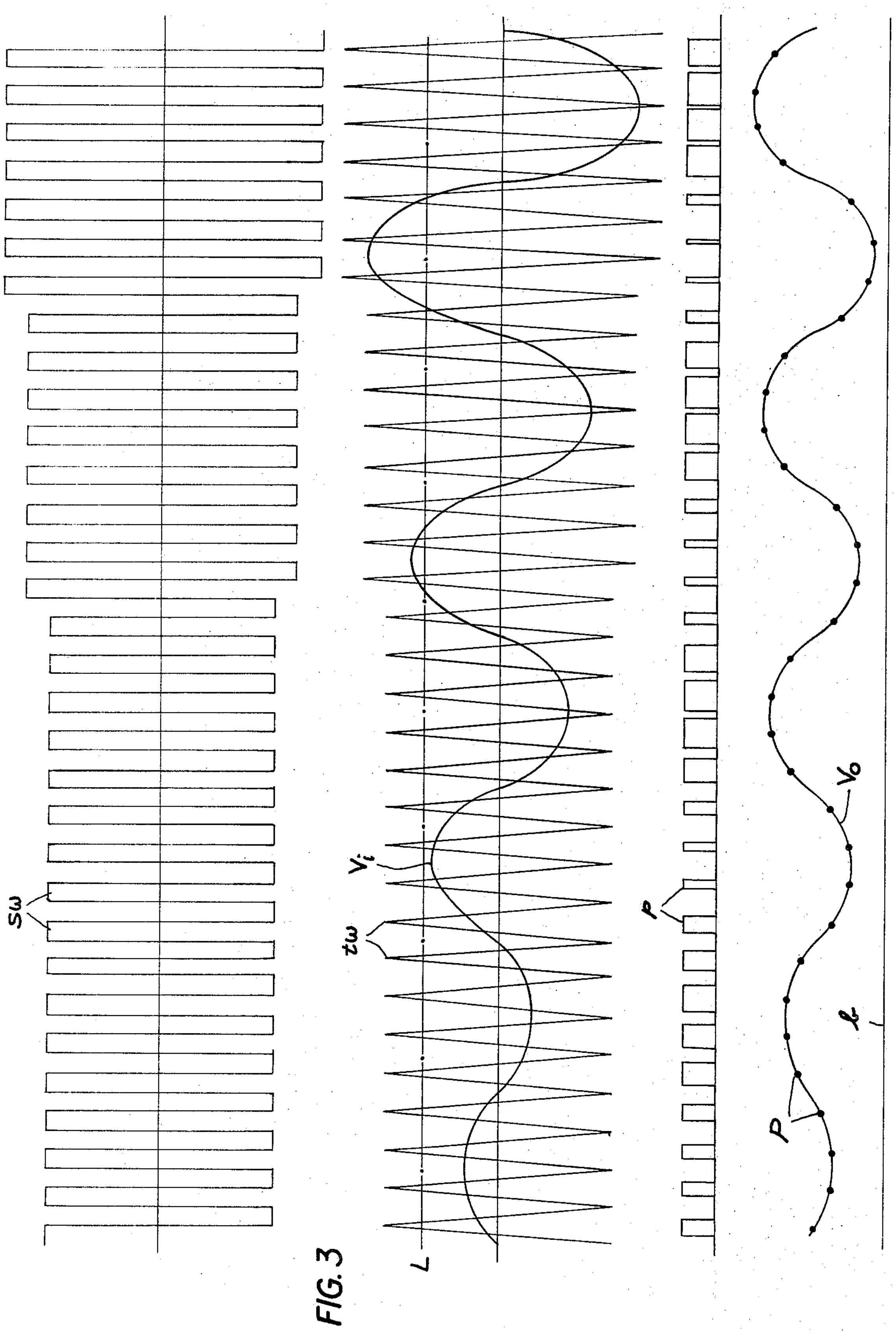
FIG. 3 is a set of graphs serving to explain the operation of the system of FIG. 2.

The operation of the system of FIG. 2 as an amplitude compressor (curve $k'$ of FIG. 1) will be apparent from FIG. 3 which shows the square wave *sw*, the triangular wave *tw*, the input voltage $V_i$, the pulse train *p* and the output voltage $V_o$. As long as the peaks of the sine wave constituting the input voltage $V_i$ remain below the level L, the amplitude of square wave *sw* is constant; as soon as the input voltage surpasses the level L, this amplitude increases progressively but at a lesser rate than the peaks of voltage $V_i$.

Triangular wave *tw* follows the amplitude variations of the symmetrical square wave *sw* and, like the latter, has a frequency substantially exceeding the highest frequency of the square wave $V_i$, i.e. greater than twice that highest frequency. Also, as shown, the peak amplitude of triangular wave *tw* is always greater than that of signal wave $V_i$. Comparator D generates a binary voltage of a first value (here lower) when the instantaneous magnitude of voltage $V_i$ exceeds the instantaneous magnitude of voltage *tw* and of a second value in the opposite case. The pulses *p* in the output of that comparator therefore vary in width so as to be relatively narrow, in this particular instance, for positive signal voltages $V_i$ and relatively wide for negative signal voltages. The rise in the amplitude of wave *tw* limits, however, the change in pulse width so that the difference between the narrowest and the widest pulses does not increase as rapidly with voltage $V_i$ as it would if the amplitude of wave *tw* remained constant. Points P of integrated output voltage $V_o$ are spaced from a base line *b* by a distance proportional to the width of pulses *p* and, as will be seen, define a sinusoidal wave which is a substantial, albeit reversed, replica of wave $v_i$ in which, however, the amplitude swing has been considerably reduced.

Figure 4:
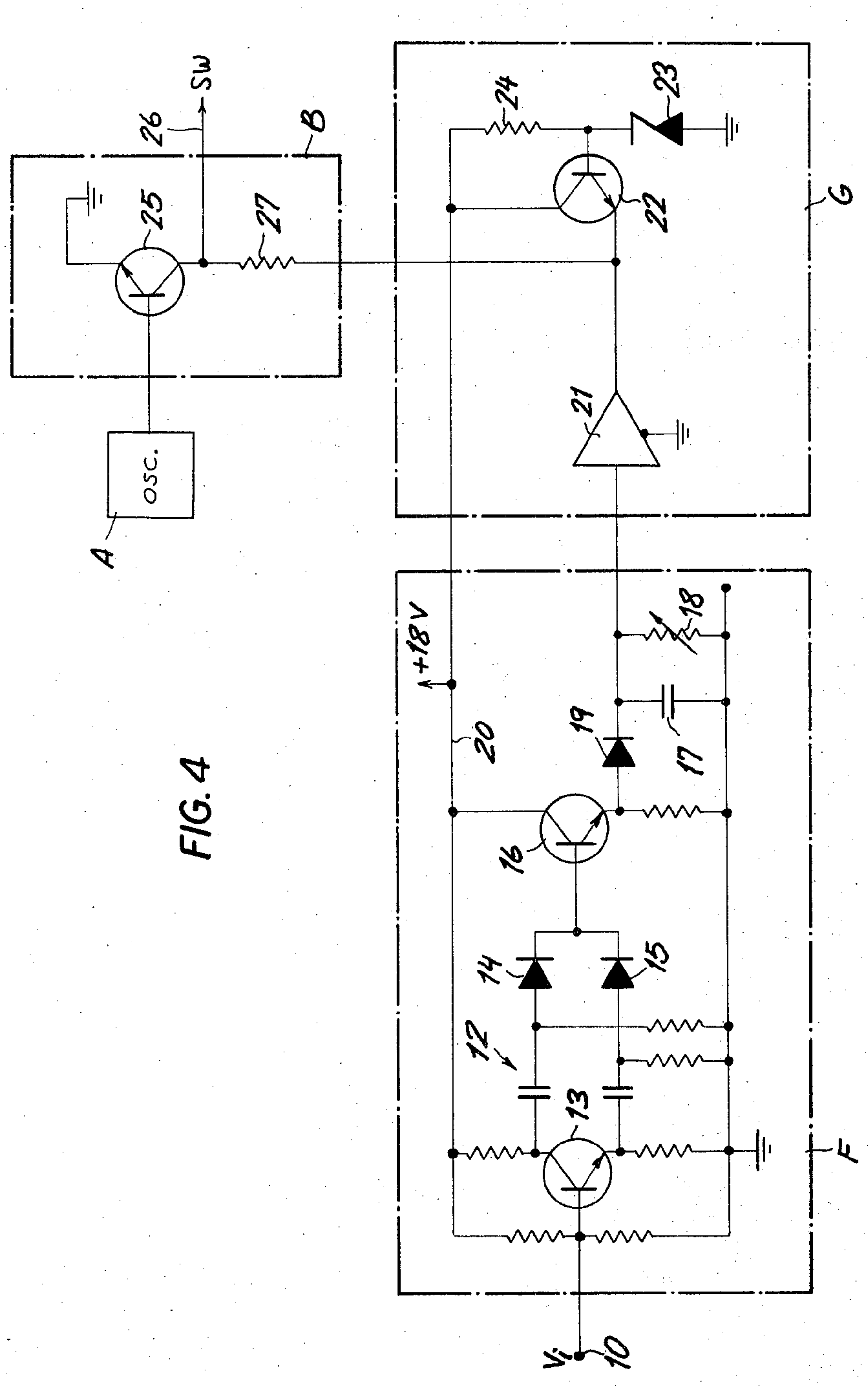
FIG. 4 is a more detailed circuit diagram of certain components of that system.

FIG. 4 illustrates details of peak rider F which comprises a sampling stage 12 including a transistor 13 and a pair of diodes 14, 15, the rectified output of transistor 13 being delivered to a storage circuit including a transistor 16, a capacitor 17 and an adjustable leakage resistor 18 connected through a diode 19 to the emitter of the latter transistor. The two transistors 13, 16 are energized with positive voltage (here of 18V) from a bus bar 20. The adjustment of resistor 18 enables a variation in the time constant of the storage network 17–19 which should be on the order of magnitude of the cycle length of the lowest signal frequency.

Clamping circuit G includes an amplifier 21 connected across capacitor 17, this amplifier feeding the emitter of a transistor 22 whose collector is tied to the positive bus bar 20 and whose base is biased from that collector by a Zener diode 23 in series with a resistor 24. Zener diode 23 establishes a threshold which holds the transistor 22 saturated as long as the output voltage of amplifier 21 does not exceed the potential of bus bar 20; under these circumstances, the collector of a transistor 25 in modulator stage B is energized through a resistor 27 with an invariable voltage of 18V so as to transmit the square wave *sw* of oscillator A with a constant amplitude to an output lead 26. As soon as the output voltage of amplifier 21 rises above the supply voltage on bus bar 20 (point S in FIG. 1), transistor 22 cuts off and lets the amplifier 21 energize the collector of transistor 25 with its own voltage by way of resistor 27. The amplitude of square wave *sw* thus varies with the stored peak amplitude of signal wave $V_i$ in the manner described above with reference to FIG. 3.

Clamping transistor 22 wth Zener diode 23 operates essentially as a rectifier and voltage stabilizer.

We claim:

1. A method of modifying the ratio between the amplitudes of an incoming signal voltage and an outgoing voltage representing a substantial replica thereof, comprising the steps of:
generating a triangular voltage wave of a constant frequency and a peak amplitude both substantially exceeding those of said signal voltage;
varying the amplitude of said triangular wave in a manner bearing a nonlinear relationship with the maximum amplitude of said signal voltage;
continuously comparing the instantaneous magnitudes of said signal voltage and said triangular wave;
generating a binary voltage having a first pulse width when the instantaneous magnitude of said signal voltage exceeds that of said triangular wave and having a second pulse width when the instantaneous magnitude of said triangular wave exceeds that of said signal voltage; and
integrating said binary voltage over periods of said first and second pulse widths to produce said outgoing voltage.

2. A method as defined in claim 1 wherein the peak amplitude of said triangular wave is maintained constant upon said maximum amplitude remaining below a predetermined level and is progressively varied upon said maximum amplitude rising above said level.

3. A method as defined in claim 2 wherein the peak amplitude of said triangular wave is progressively increased upon said maximum amplitude rising above said level.

4. A method as defined in claim 1 wherein said triangular wave is derived from a square wave of proportional amplitude, the step of varying the amplitude of said triangular wave being performed by amplitude-modulating said square wave.

5. A system for modifying the ratio between the amplitudes of an incoming signal voltage and an outgoing voltage representing a substantial replica thereof, comprising:
input means for receiving said signal voltage;
circuitry including an oscillator for generating a triangular voltage wave of a constant frequency and a peak amplitude both substantially exceeding those of said signal voltage;
amplitude-modulating means connected to said circuitry for varying said peak amplitude;
peak-riding means connected to said input means for receiving said signal voltage and determining the maximum amplitude thereof, said amplitude-modulating means being controlled by said peak-riding means for varying the peak amplitude of said triangular wave in a nonlinear relationship with said maximum amplitude;
comparison means connected to said circuitry and to said input means for generating a binary voltage having a first pulse width when the instantaneous magnitude of said signal voltage exceeds that of said triangular wave and having a second pulse width when the instantaneous magnitude of said triangular wave exceeds that of said signal voltage; and filter means connected to said comparison means for converting said binary voltage into said outgoing voltage.

6. A system as defined in claim 5 wherein said amplitude-modulating means comprises a clamping circuit including rectifying means for generating a constant control voltage upon said maximum amplitude remaining below a predetermined threshold, said control voltage progressively increasing upon said maximum amplitude rising above said threshold.

7. A system as defined in claim 6 wherein said rectifying means comprises a transistor with a base/emitter circuit including a Zener diode and with a collector connected to a source of constant reference voltage, the emitter of said transistor being connected to the output of said peak-riding means.

8. A system as defined in claim 5 wherein said peak-riding means comprises a full-wave rectifier and capacitive storage means connected to said rectifier.

9. A system as defined in claim 5 wherein said oscillator comprises a square-wave generator and said circuit means further includes integrating means connected to said generator for producing said triangular wave.

10. A system as defined in claim 9 wherein said square-wave generator has an output stage working into said integrating means and forming part of said amplitude-modulating means.

* * * * *